US008101934B2

United States Patent
Chen et al.

(10) Patent No.: US 8,101,934 B2
(45) Date of Patent: Jan. 24, 2012

(54) METHODS AND APPARATUS FOR DETECTING A SUBSTRATE NOTCH OR FLAT

(75) Inventors: Hui Chen, Burlingame, CA (US); Haochuan Zhang, Sunnyvale, CA (US); Noel A. Manto, Walnut Creek, CA (US)

(73) Assignee: Applied Materials, Inc., Santa Clara, CA (US)

( * ) Notice: Subject to any disclaimer, the term of this patent is extended or adjusted under 35 U.S.C. 154(b) by 163 days.

(21) Appl. No.: 11/683,420

(22) Filed: Mar. 7, 2007
(Under 37 CFR 1.47)

(65) Prior Publication Data

US 2008/0006785 A1    Jan. 10, 2008

Related U.S. Application Data

(60) Provisional application No. 60/780,669, filed on Mar. 7, 2006.

(51) Int. Cl.
*G01V 8/00* (2006.01)
(52) U.S. Cl. .................. 250/559.36; 134/1.2; 134/1.3
(58) Field of Classification Search ............ 250/559.36; 134/1.2, 1.3
See application file for complete search history.

(56) References Cited

U.S. PATENT DOCUMENTS

| | | | | |
|---|---|---|---|---|
| 5,183,378 | A * | 2/1993 | Asano et al. | 414/757 |
| 5,745,946 | A * | 5/1998 | Thrasher et al. | 15/77 |
| 6,575,177 | B1 * | 6/2003 | Brown et al. | 134/76 |
| 2003/0030795 | A1 * | 2/2003 | Swan et al. | 356/237.4 |
| 2006/0131521 | A1 * | 6/2006 | Garssen et al. | 250/559.33 |
| 2006/0166382 | A1 * | 7/2006 | Kim | 438/14 |
| 2006/0185792 | A1 * | 8/2006 | Yashiki et al. | 156/345.17 |

FOREIGN PATENT DOCUMENTS

JP          09312325 A  * 12/1997

* cited by examiner

*Primary Examiner* — Georgia Y Epps
*Assistant Examiner* — Kevin Wyatt
(74) *Attorney, Agent, or Firm* — Dugan & Dugan, PC

(57) ABSTRACT

In a first aspect, a first apparatus is provided. The first apparatus includes a through-beam sensor coupled to a scrubber and adapted to detect a notch or flat of a substrate in the scrubber during processing. The through-beam sensor has (1) an emitter facing a first major surface of a substrate in the scrubber and adapted to transmit a beam toward an edge of the first major surface; and (2) a receiver facing a second major surface of the substrate and adapted to receive the beam transmitted from the emitter when the edge of the substrate does not obstruct the beam. Numerous other aspects are provided.

23 Claims, 5 Drawing Sheets

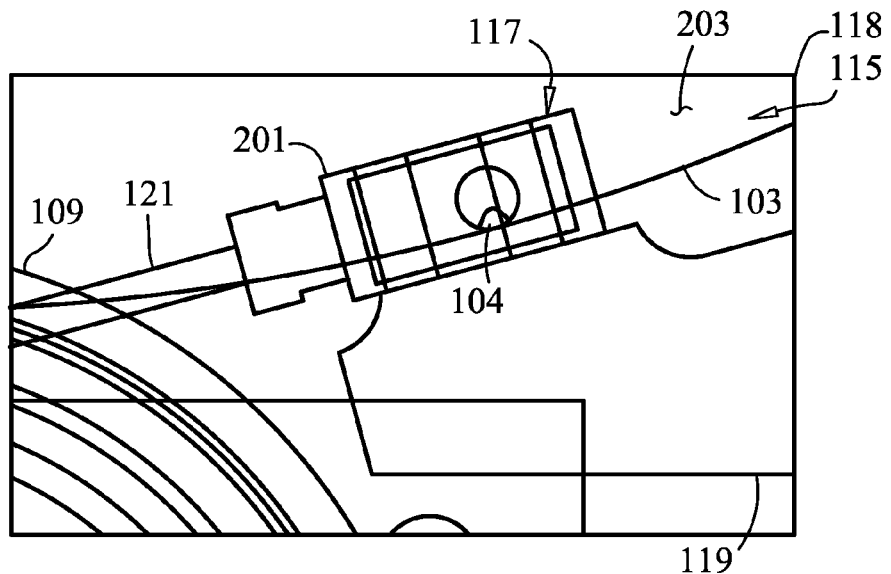
FIG. 3
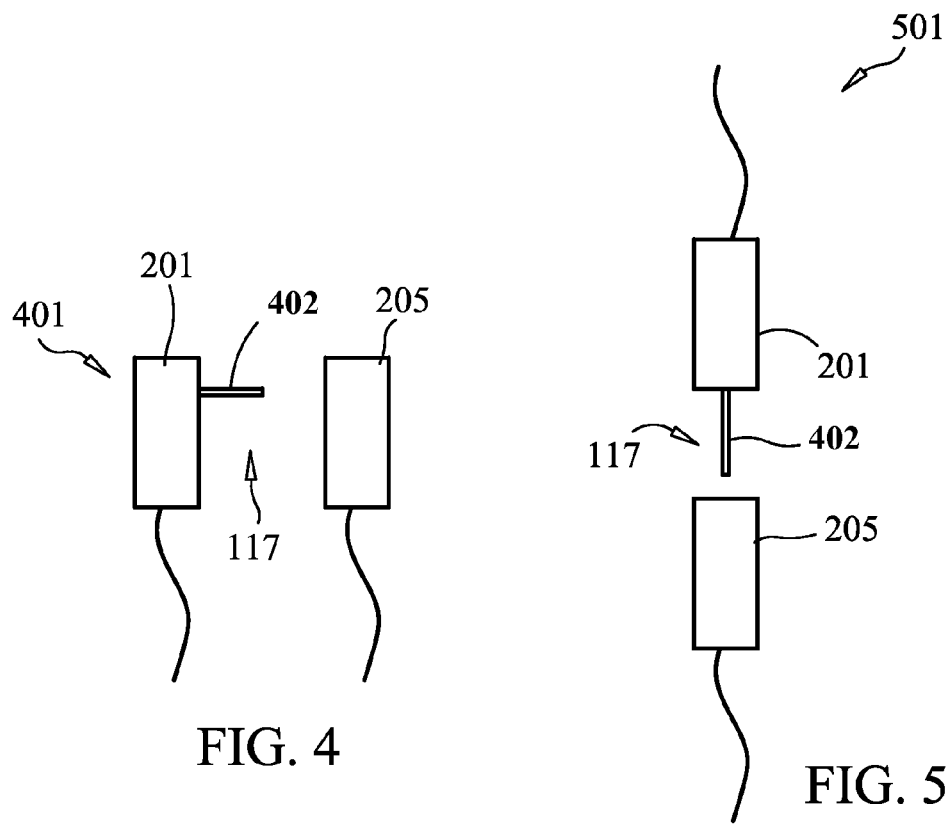
FIG. 4
FIG. 5

METHODS AND APPARATUS FOR DETECTING A SUBSTRATE NOTCH OR FLAT

The present application claims priority to U.S. Provisional Patent Application No. 60/780,669, filed Mar. 7, 2006, and entitled "METHODS AND APPARATUS FOR DETECTING A SUBSTRATE NOTCH OR FLAT," which is hereby incorporated herein for all purposes.

FIELD OF THE INVENTION

The present invention relates generally to electronic device manufacturing, and more particularly to methods and apparatus for detecting a substrate notch or flat.

SUMMARY OF THE INVENTION

In some aspects of the invention, an apparatus is provided that includes a through-beam sensor coupled to a scrubber and adapted to detect a notch or flat of a substrate in the scrubber during processing. The through-beam sensor has (1) an emitter facing a first major surface of a substrate in the scrubber and is adapted to transmit a beam toward an edge of the first major surface; and (2) a receiver facing a second major surface of the substrate and adapted to receive the beam transmitted from the emitter when the edge of the substrate does not obstruct the beam.

In other aspects of the invention, an apparatus is provided that includes a through-beam sensor coupled to a megasonic tank and adapted to detect a notch or flat of a substrate in the megasonic tank during processing. The through-beam sensor has (1) an emitter facing a first major surface of a substrate in the megasonic tank and adapted to transmit a beam toward an edge of the first major surface; and (2) a receiver facing a second major surface of the substrate and adapted to receive the beam transmitted from the emitter when the edge of the substrate does not obstruct the beam.

In yet other aspects of the invention, a method of manufacturing electronic devices is provided that includes (1) providing a through-beam sensor coupled to a scrubber and adapted to detect a notch or flat of a substrate in the scrubber during processing, wherein the through-beam sensor includes an emitter facing a first major surface of a substrate in the scrubber adapted to transmit a beam toward an edge of the first major surface, and a receiver facing a second major surface of the substrate adapted to receive the beam transmit from the emitter when the edge of the substrate does not obstruct the beam; and (2) employing the through-beam sensor to detect a notch or flat of a substrate in the scrubber during processing.

In still yet other aspects of the invention, a method of manufacturing electronic devices is provided that includes (1) providing a through-beam sensor coupled to a megasonic tank and adapted to detect a notch or flat of a substrate in the megasonic tank during processing, wherein the through-beam sensor includes an emitter facing a first major surface of a substrate in the megasonic tank adapted to transmit a beam toward an edge of the first major surface, and a receiver facing a second major surface of the substrate adapted to receive the beam transmit from the emitter when the edge of the substrate does not obstruct the beam; and (2) employing the through-beam sensor to detect a notch or flat of a substrate in the megasonic tank during processing. Numerous other aspects are provided, as are systems and apparatus in accordance with these and other aspects of the invention.

Other features and aspects of the present invention will become more fully apparent from the following detailed description, the appended claims and the accompanying drawings.

BRIEF DESCRIPTION OF THE FIGURES

FIG. 3 illustrates details of portions of the scrubber included in box 118 of FIG. 1 in accordance with embodiments of the present invention.

FIG. 4 illustrates a side-sensing sensor design in accordance with embodiments of the present invention.

FIG. 5 illustrates a front-sensing sensor design in accordance with embodiments of the present invention.

DETAILED DESCRIPTION

To ensure proper processing of a substrate and to determine the orientation of the substrate, a notch or flat of the substrate may be detected. In some embodiments, the position or orientation of the substrate, the rotational speed of the substrate, and/or any substrate breakage/damage may be determined based on the notch detection. However, successfully detecting a substrate notch or flat may be difficult in non-static, fluid environments employed during substrate processing (e.g., in a brush box or megasonic tank).

The present invention provides systems, methods, and apparatus for successfully detecting a substrate notch or flat in a non-static fluid environment employed during substrate processing. For example, the present methods and apparatus may detect a notch or flat of a substrate while the substrate is processed in a scrubber (e.g., brush box), even when fluid (e.g., cleaning chemicals, DI water, etc.) is splashing therein. As a further example, the present methods and apparatus may detect a notch or flat of a substrate while the substrate is processed in a megasonic tank, even when fluid cavitation occurs.

Figure 1:
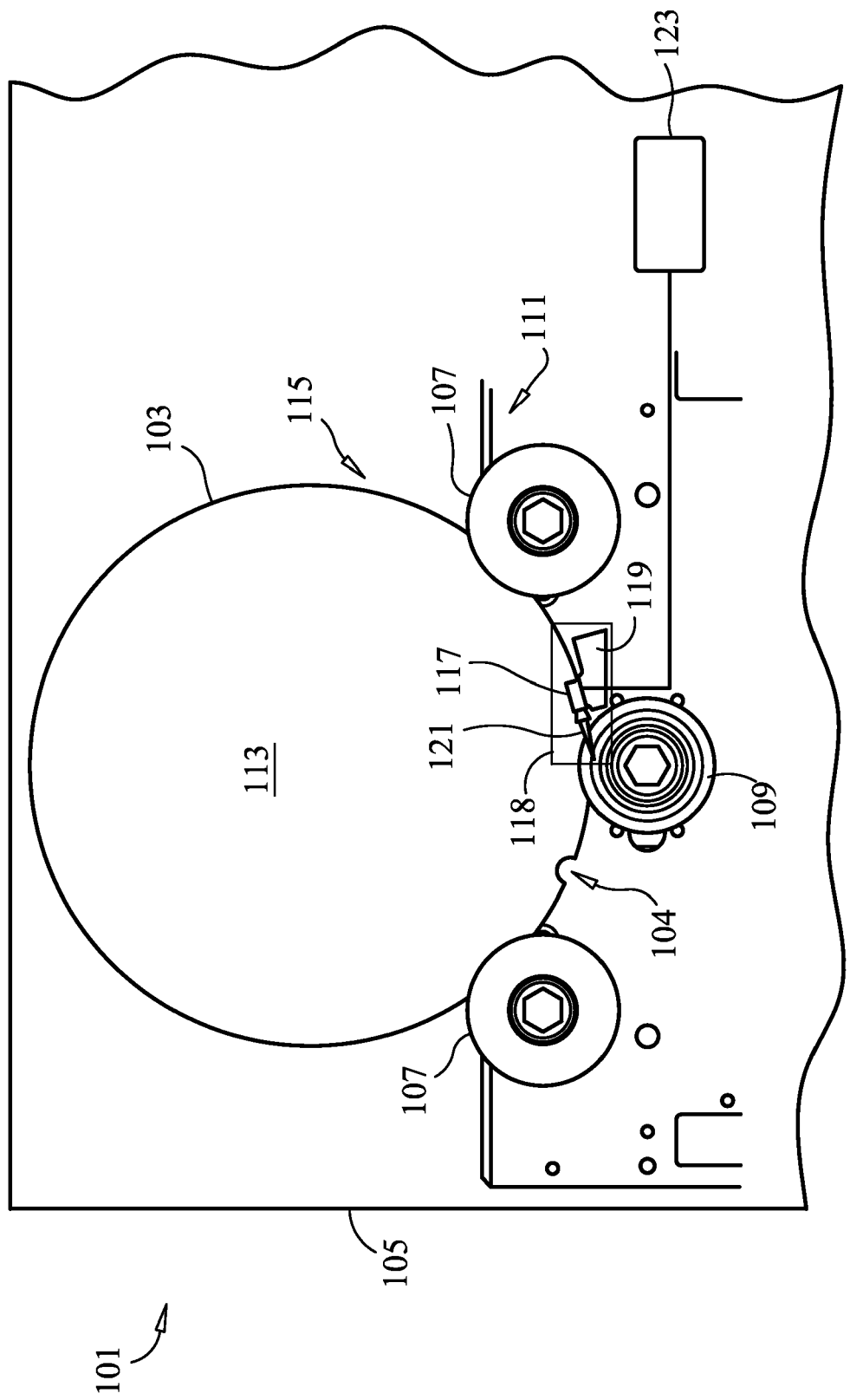
FIG. 1 is a front view of a scrubber including a through-beam sensor in use during electronic device processing in accordance with embodiments of the present invention.

FIG. 1 is a front view of a scrubber 101 including a through-beam sensor for use in electronic device processing in accordance with embodiments of the present invention. With reference to FIG. 1, a scrubber (e.g., brush box) 101 may be employed to clean a substrate (e.g., wafer or the like) 103 inserted therein during electronic device manufacturing. The substrate 103 may include a notch or flat 104 which identifies a known position on the substrate 103. Tank walls 105 (only one shown) of the scrubber 101 may be employed to enclose fluids used while processing (e.g., cleaning) the substrate 103. The scrubber 101 may include one or more drive rollers 107 and one or more idler rollers (hereinafter "idlers") 109. The drive rollers 107 and idlers 109 may be adapted to couple to and support the substrate 103 (e.g., an edge thereof). Further, the drive rollers 107 may be adapted to rotate the substrate 103 coupled thereto during cleaning. The scrubber 101 may include a base 111 to which the drive rollers 107 and/or idlers 109 may be mounted. In some embodiments, the base 111 may include Ertalyte or similar material.

The base 111, drive rollers 107 and idlers 109 may be oriented such that the major surfaces 113 (only one visible) of the substrate 103 are approximately vertical when the substrate 103 is supported by the drive rollers 107 and idlers 109. In such embodiments, at least one idler 109 may be between two drive rollers 107, all of which may contact a lower portion of the edge 115 of the approximately vertically-oriented substrate 103. However, the position of the idler 109 relative to the drive rollers 107 may be different than shown in FIG. 1. Additionally or alternatively, the position of the drive rollers 107 and/or idlers 109 relative to the vertically-oriented substrate may be different than shown in FIG. 1.

During operation, the one or more drive rollers 107 may rotate the substrate 103 while cleaning the substrate 103. For example, the drive rollers 107 may rotate the substrate 103 while fluid (e.g., cleaning fluid, deionized water and/or the like) are sprayed on the substrate 103. Rotating the substrate 103 during cleaning may enhance cleaning of a major surface 113 and/or an edge 115 of the substrate 103.

To effectively clean a substrate 103, a substrate 103 should be properly positioned in the scrubber 101 and properly rotated at a predetermined speed. By detecting the notch or flat 104 of a substrate 103 in the scrubber 101 during cleaning, the position and/or rotation speed of a substrate 103 in the scrubber 101 may be determined. Therefore, the scrubber 101 may include an optical through-beam sensor 117 adapted to detect a notch or flat 104 of a substrate 103 in the scrubber 101 during processing. The through-beam sensor 117 may employ a beam or light to detect the notch or flat 104 of a substrate 103 which is rotating during processing. Portions of the sensor 117 may include a material, such as stainless steel, adapted to withstand temperatures (e.g., >75° C.) and/or chemicals (e.g., SC100, ammonia and/or the like). In some embodiments, a SUNX sensor (CFT 0098)/amp combo (FX-305) may be employed as the through-beam sensor 117 (although a different sensor may be employed).

Because the edge 115 of the substrate 103 may be supported by the one or more drive rollers 107 and one or more idlers 109, as the substrate 103 rotates during processing, the notch or flat 104 may be expected to pass proximate such rollers 107, 109. Therefore, the through-beam sensor 117 may be positioned proximate one of the drive rollers 107 or idlers 109, although other positions are possible. Consequently, the through-beam sensor 117 may successfully detect a notch or flat 104 of a substrate 103 even when a position of the substrate 103 is continually changing during processing. Further, due to the proximity of the through-beam sensor to a drive roller 107 or an idler 109, even if substrates of different sizes are employed, the through-beam sensor 117 may successfully detect a notch or flat 104 such substrates 103. For example, the through-beam sensor 117 may be positioned about 10 mm to about 15 mm from a drive roller 107 or an idler 109 (although a larger or smaller and/or different distance range may be employed).

As shown in box 118, a sensor mounting bracket 119 may be employed to couple the through-beam sensor 117 to the scrubber proximate a drive roller 107 or an idler 109. The sensor mounting bracket 119 may be coupled to the base 111 (although the bracket 119 may be coupled to a different portion of the scrubber 103). In some embodiments, the sensor mounting bracket may be made of PEEK™ or another suitable material adapted to resist one or more temperatures and/or chemicals employed during substrate processing. Additionally, one or more cables 121 may be employed to couple the through-beam sensor 117 to the sensor mounting bracket 119, thereby securing the sensor 117 to the bracket 119 during processing.

Further, a controller 123 may be coupled to the through-beam sensor 117. The controller 123 may be adapted to reduce or filter noise created while the through-beam sensor 117 is attempting to detect the notch or flat 104 of the substrate 103 such that the substrate notch or flat 104 may be successfully and reliably detected. Such noise (e.g., false readings) may be created by fluid splashing in the scrubber 101 near the through-beam sensor 117 during processing.

Figure 2:
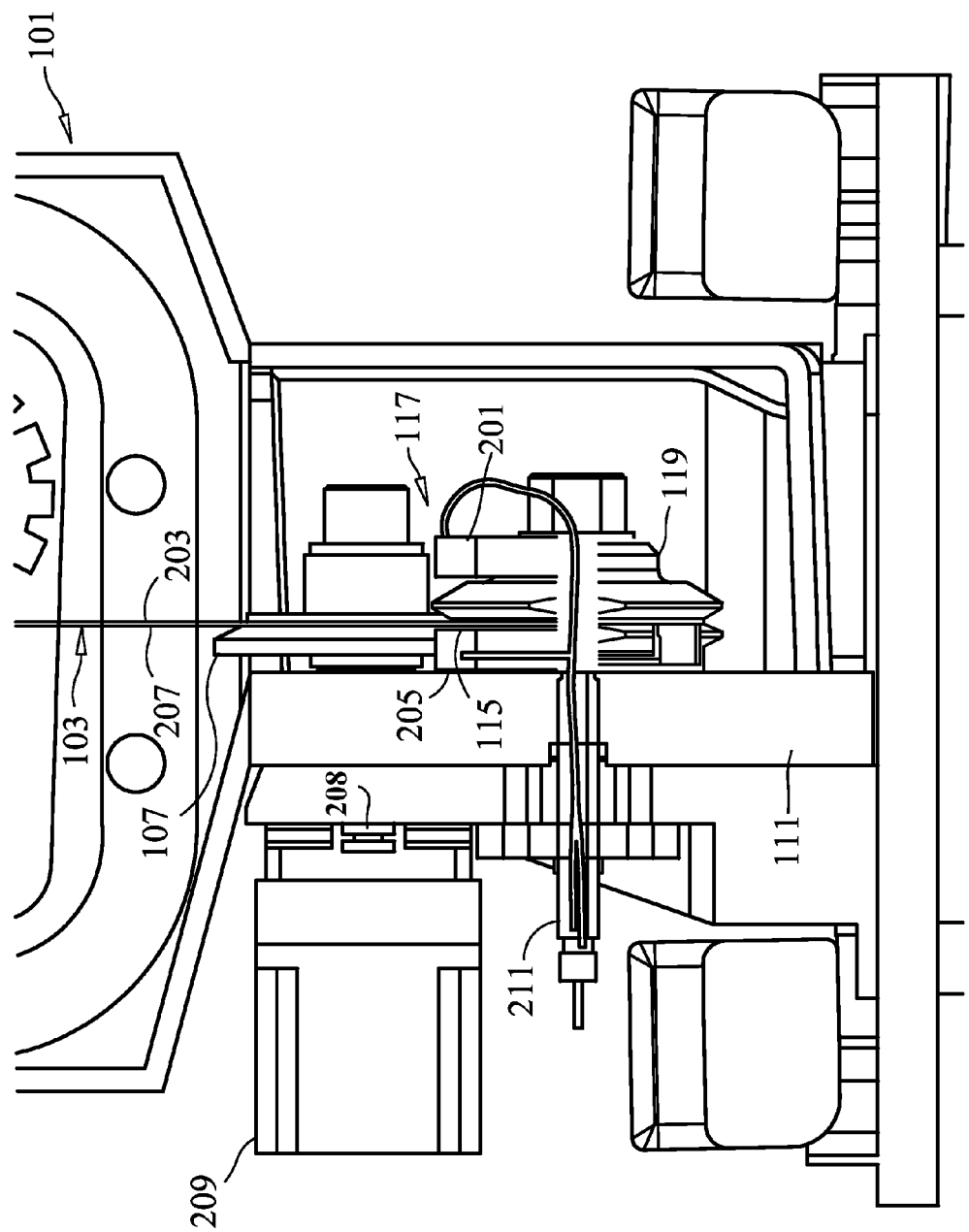
FIG. 2 is a cross-sectional side view of the scrubber including the through-beam sensor in use during electronic device processing in accordance with embodiments of the present invention.

FIG. 2 is a cross-sectional side view of the scrubber 101 including the through-beam sensor 117 in use during electronic device processing in accordance with an embodiment of the present invention. With reference to FIG. 2, the through-beam sensor 117 may include an emitter 201 facing a first major surface 203 of the substrate 103 and adapted to transmit a beam toward an edge 115 of the first major surface 203 of the substrate 103. Additionally, the through-beam sensor 117 may include a receiver 205 facing a second major surface 207 of the substrate 103. The receiver 205 may be adapted to receive the beam transmitted from the emitter 201 when the edge 115 of the substrate 103 does not obstruct the beam. Assuming a substrate 103 being processed by the scrubber 101 is properly positioned and not broken, an edge 115 of the first major surface 203 of the substrate 103 may prevent the beam transmitted by the emitter 201 from reaching the receiver 205 a majority of the time as the substrate 103 rotates. However, when the substrate notch or flat 104 passes between the emitter 201 and receiver 205 of the through-beam sensor 117, the substrate 103 does not block the beam transmitted from the emitter 201, and therefore, the receiver 205 may detect such beam. In this manner, the substrate notch or flat may be detected.

As shown, a portion 208 of the drive roller 107 may extend through the base 111, and a motor 209 may be coupled to such portion 207 of the drive roller 107. The motor 209 may be adapted to cause the drive roller 107 to rotate, thereby rotating a substrate 103 coupled to the drive roller 107.

Further, a single sensor mounting bracket 119 may be employed to support the through-beam sensor emitter 201 and receiver 205. The mounting bracket 119 may be inserted through the base 111. Such a mounting bracket 119 may allow for position adjustment of the emitter 201 and/or receiver 205, thereby enabling alignment of the emitter 201 and receiver 205. However, in alternative embodiments, separate brackets may be employed to support the emitter 201 and receiver 205, respectively. Further, the one or more cables 121 may be employed to couple the emitter 201 and receiver 205 to the sensor mounting bracket 119 (e.g., to a portion 211 of the bracket 119 on a side of the base 111 opposite the through-beam sensor 117).

The through-beam sensor 117 and one or more cables 121 may be included in the scrubber 101. Therefore, to avoid damage from one or more temperatures and/or chemicals employed by the scrubber 101 during processing, the through-beam sensor 117 and one or more cables 121 may be coated with a material (e.g., Teflon) that is resistant to such temperatures and/or chemicals.

In addition to drive roller or idler proximity, the through-beam sensor 117 may be proximate one or more major surfaces 203, 207 of the substrate 103. For example, the emitter 201 may be about 10 mm to about 20 mm (e.g., about 15 mm) from the first major surface 203 and the receiver 205 may be about 10 mm to about 20 mm (e.g., about 15 mm) from the second major surface 207 of the substrate 103 (although the emitter 201 and/or receiver 205 may be a larger or smaller distance from the substrate 103). Such sensor proximity to the substrate 103 may result in a strong signal transmitted between the emitter 201 and receiver 205. Consequently, the through-beam sensor 117 may detect the substrate notch or flat 104 with precision (e.g., even when fluid is splashing in the scrubber 101).

FIG. 3 illustrates details of portions of the scrubber 101 included in box 118 of FIG. 1 in accordance with embodiments of the present invention. With reference to FIG. 3, in operation, the scrubber 101 may rotate the substrate 103. The through-beam sensor 117 may emit a beam toward the first major surface 203 of the substrate 103. As stated, assuming a substrate 103 being processed by the scrubber 101 is properly positioned and not broken, an edge 115 of the first major surface 203 of the substrate 103 may prevent the beam transmitted by the emitter 201 from reaching the receiver (obstructed in FIG. 3; 205 in FIG. 2) a majority of the time as the substrate 103 rotates. However, as shown, the substrate notch or flat 104 may pass between the emitter 201 (shown in phantom) and receiver 205 (obstructed by the emitter 201 in FIG. 3) of the through-beam sensor 117. During such time the substrate 103 does not block the beam transmitted from the emitter 201, and therefore, the receiver 205 may detect such beam. In this manner, the substrate notch or flat 104 may be detected. Based on substrate notch or flat 104 detection, the scrubber 101 may determine drive roller 107 and/or idler 109 performance. The scrubber 101 may determine at least one of a position of the substrate 103, rotation speed of the substrate 103, and/or a break in the substrate 103 based on the substrate notch or flat 104 detection.

The scrubber 101 may employ different orientations of the through-beam sensor 117. For example, FIG. 4 illustrates a side-sensing sensor design 401 in accordance with an embodiment of the present invention. With reference to FIG. 4, the emitter 201 may be adapted to emit a beam 402 approximately perpendicular to a longitudinal axis of the emitter 201 and a longitudinal axis of the receiver 205. Alternatively, FIG. 5 illustrates a front-sensing sensor 501 design in accordance with an embodiment of the present invention. With reference to FIG. 5, the emitter 201 may be adapted to emit a beam 402 approximately coincident with a longitudinal axis of the emitter 201 and a longitudinal axis of the receiver 205. Although FIGS. 4 and 5 describe side-sensing and front-sensing sensor designs 401, 501, other, different orientations of the through-beam sensor 117 may be employed.

Through use of the present methods and apparatus, a scrubber 101 may include an optical through-beam sensor 117. The through-beam sensor 117 may be employed to detect a substrate notch or flat 104, and may determine drive roller 107 and/or idler 109 performance, a position of the substrate 103, rotation speed of the substrate 103, and/or a break in the substrate 103 based on the substrate notch or flat 104 detection.

The optical through-beam sensor 117 may be positioned proximate a substrate drive roller and/or an idler. Further, the optical through-beam sensor 117 may be positioned proximate the substrate 103 (e.g., major surfaces 203, 207 thereof). Consequently, the through-beam sensor 117 may reliably and successfully detect a substrate notch or flat 104.

Further, during operation, an error condition may occur and the receiver 205 may receive the beam transmitted from the emitter 201 even though the substrate notch or flat 104 is not between the emitter 201 and receiver 205. For example, if the position of a substrate changes (e.g., jumps up more than slightly) during processing, the receiver 205 may receive the beam more frequently than once every time the substrate notch or flat 104 passes between the sensor emitter 201 and receiver 205. Similarly, if the substrate 103 breaks (e.g., during processing), the receiver 205 may receive the beam more frequently than once every time the substrate notch or flat 104 passes between the sensor emitter 201 and receiver 205. To remedy such conditions, irregularities in the timing of detecting the notch, for example, may be identified as potential errors and corrective action may be taken. For example, if the notch 104 is detected more frequently than an expected amount based upon the size of the substrate 103 and the speed of the drive rollers 107, the controller 120 may determine that the substrate 103 is not properly positioned or seated in the drive rollers 107 and or idler 109, and may choose to slow down the rotation of the drive rollers 107 so that the position of the substrate 103 may be corrected.

The foregoing description discloses only exemplary embodiments of the invention. Modifications of the above disclosed apparatus and methods which fall within the scope of the invention will be readily apparent to those of ordinary skill in the art.

In at least one embodiment of the invention, substrate notch sensing may be performed using a simple optical thru-beam sensor that is installed very close to a substrate drive roller and/or idler roller, and near a surface of the substrate. The design may use either a thru-beam sensor with side sensing or straight front end sensing. The sensor preferably is compatible with the temperatures and/or chemistries employed during substrate processing. In alternative embodiments, multiple sensors and/or arrays of sensors may be used including reflected beam sensors. The inventive system and methods may be used to detect substrate breakage, for substrate rotation monitoring, and/or to monitor substrate drive roller and idler functional performance.

The inventive system may include an optical sensor (emitter and receiver) and a sensor mounting bracket. In some embodiments, the optical sensor may be mounted into a brush box or megasonic tank, for example, near the substrate driver roller and idler.

In some embodiments of the invention, the system may operate in a threshold mode. For example, because of bubbles and/or turbulence created during a process such as scrubbing or megasonics, an amplifier that amplifies signals from the receiver may be set to ignore transients created by such bubbles and/or turbulence. For example, adjusting the on-time delay can filter unwanted signal.

The notch may be sensed by characterizing how much light can be allowed and setting the threshold value at a minimum, such as 4× or another multiplier of, the contrast (beam blocked) state. An exemplary sensor that may be used includes the SUNX sensor (CFT 0098)/amp combo (FX-305). An exemplary sensor head may have an approximately 1 meter sensing range and a relatively narrow ~1 mm beam. Other sensors, sensing ranges and/or beams sizes may be used.

In some embodiments, the notch sensed output may be pulsed for a very short period, and/or the signal may be stretched by an off-time delay.

In one or more embodiments, the system may operate in a differential mode. For example, the system may detect a notch using a set light change. With proper calibration, the detection may be made immune to changes in substrate eccentricity, run out, or a substrate coming out of contact with the drive and idler rollers (e.g., jumping up out of the "pocket"). An advantage of this mode is that with an appropriate angled sensor and current (e.g., power) combination, mechanical adjustment is less of an issue since the system is less sensitive to mechanical error.

In some embodiments, if the at least one drive roller is on a first side of the base, a motor, adapted to rotate the roller, may be coupled to the drive roller on the opposite side of the base. The scrubber may include a through-beam sensor therein. The through-beam sensor may include an emitter and a receiver coupled to and on opposite sides of the base (only the emitter is shown in the front view).

The emitter may face a first major surface of the substrate in the substrate processing device. The receiver may face a second major surface of the substrate in the substrate processing device. The through-beam sensor may be adapted to detect a notch or flat of the substrate as the rollers cause the substrate to rotate during processing. A bracket may be employed to couple the sensor to the scrubber. For example, a single bracket may be employed to couple the sensor emitter and receiver to the base (although separate brackets may be used to couple the emitter and receiver to the base, respectively). The bracket may include PEEK or another suitable material adapted to withstand processing chemicals and temperatures.

In some embodiments, the sensor may be positioned about 10 to about 15 mm from one of the rollers. The closer the sensor is to the roller, the greater the probability of successfully detecting the substrate flat or notch even when substrate position changes slightly or when a substrate of a different size is employed. Further, the emitter and/or receiver may be positioned about 15 mm from first and second major surfaces of the substrate, respectively. The closer the emitter and receiver are to the substrate, and therefore, to each other, the stronger the signal detected by the receiver. Other distances from the roller and/or major surfaces of the substrate may be used.

A cable may be employed to couple the sensor to a wall of the tank or to secure the sensor to the bracket. Because the sensor is within the scrubber, the sensor may be coated with a material (e.g., Teflon) such that the sensor may be protected from harmful temperatures and/or chemicals employed during processing. The cable may be coated in a similar manner.

Substrate breakage may be determined based on the substrate notch or flat detection. Additionally, substrate rotation speed may be determined based on the substrate notch or flat detection. The substrate rotation speed may indicate drive and/or idle roller performance. A controller and/or sensor power supply may be coupled to the through-beam sensor. The controller may filter out noise while detecting the substrate notch or flat.

The emitter may continue to transmit a beam toward an edge of the first major surface. The receiver may receive the beam transmitted from the emitter when the edge of the substrate does not obstruct the beam. In this manner, assuming the substrate is positioned properly in the scrubber and is not broken, the receiver may receive the beam when the notch or flat passes between sensor emitter and receiver. Fluid splashing during processing in the scrubber typically will not prevent the through-beam sensor from detecting the substrate notch or flat like in reflection-based sensors.

Figure 6:
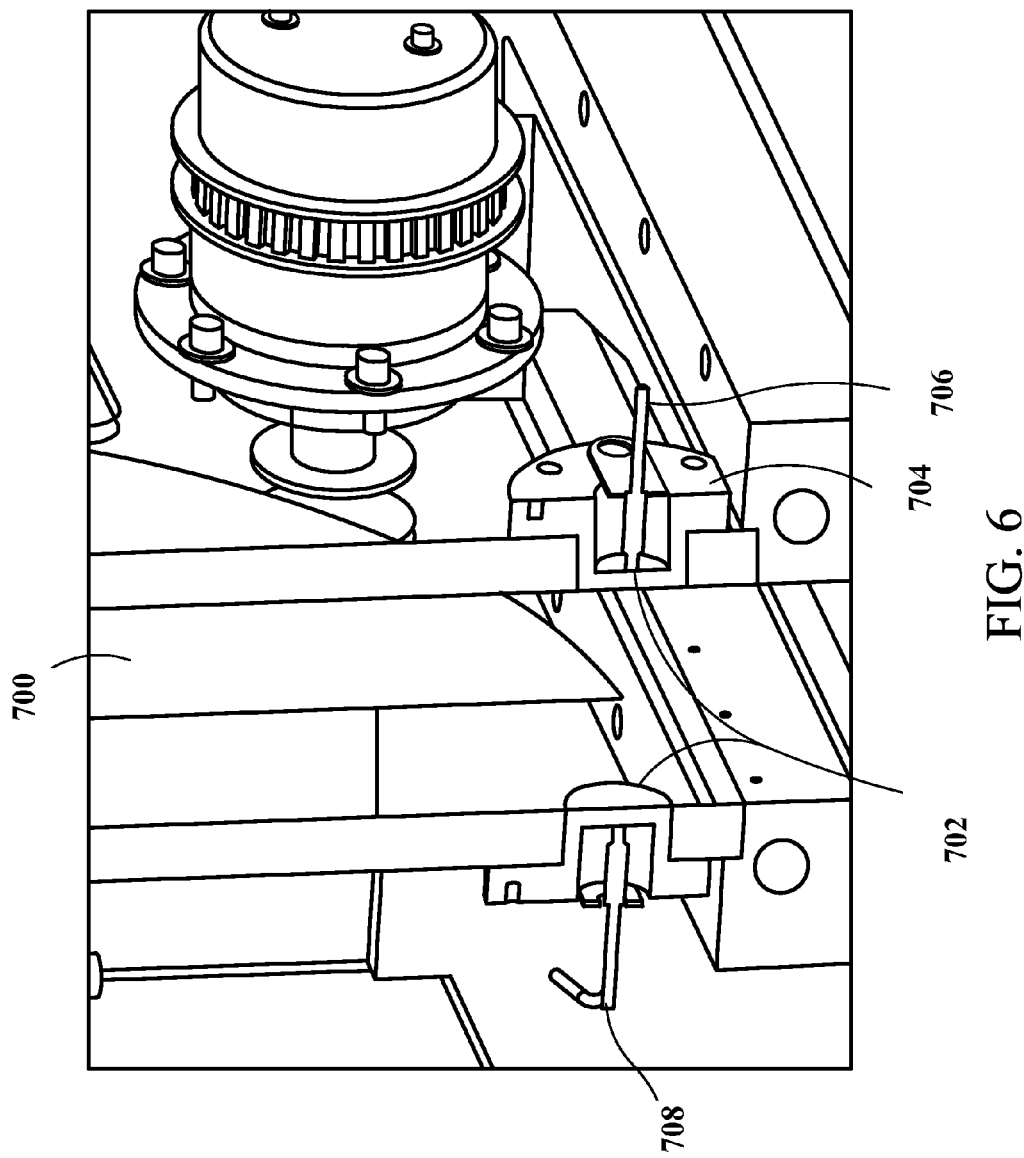
FIG. 6 is a cross-sectional side view of a megasonic tank in use during electronic device processing in accordance with embodiments of the present invention.

FIG. 6 is a cross-sectional side view of a megasonic tank used in substrate 700 processing in accordance with an embodiment of the present invention. With reference to FIG. 6, in contrast to the sensor in the scrubber box of FIGS. 1-3, the sensor in the megasonic tank may be outside the tank. For example, a housing 702 for the sensor may be coupled to opposing sidewalls of the megasonic tank. The housing 702 may be quartz, clear haylar or another suitable material. A bracket 704 may be employed to couple the emitter 706 to the housing 702 coupled to a first sidewall of the megasonic tank. Such a bracket 704 may enable adjustment of the emitter in the housing 702. Similarly a bracket may be employed to couple the receiver 708 to a second housing 702 coupled to a second sidewall of the megasonic tank. Such bracket may enable adjustment of the receiver in the housing.

Figure 7:
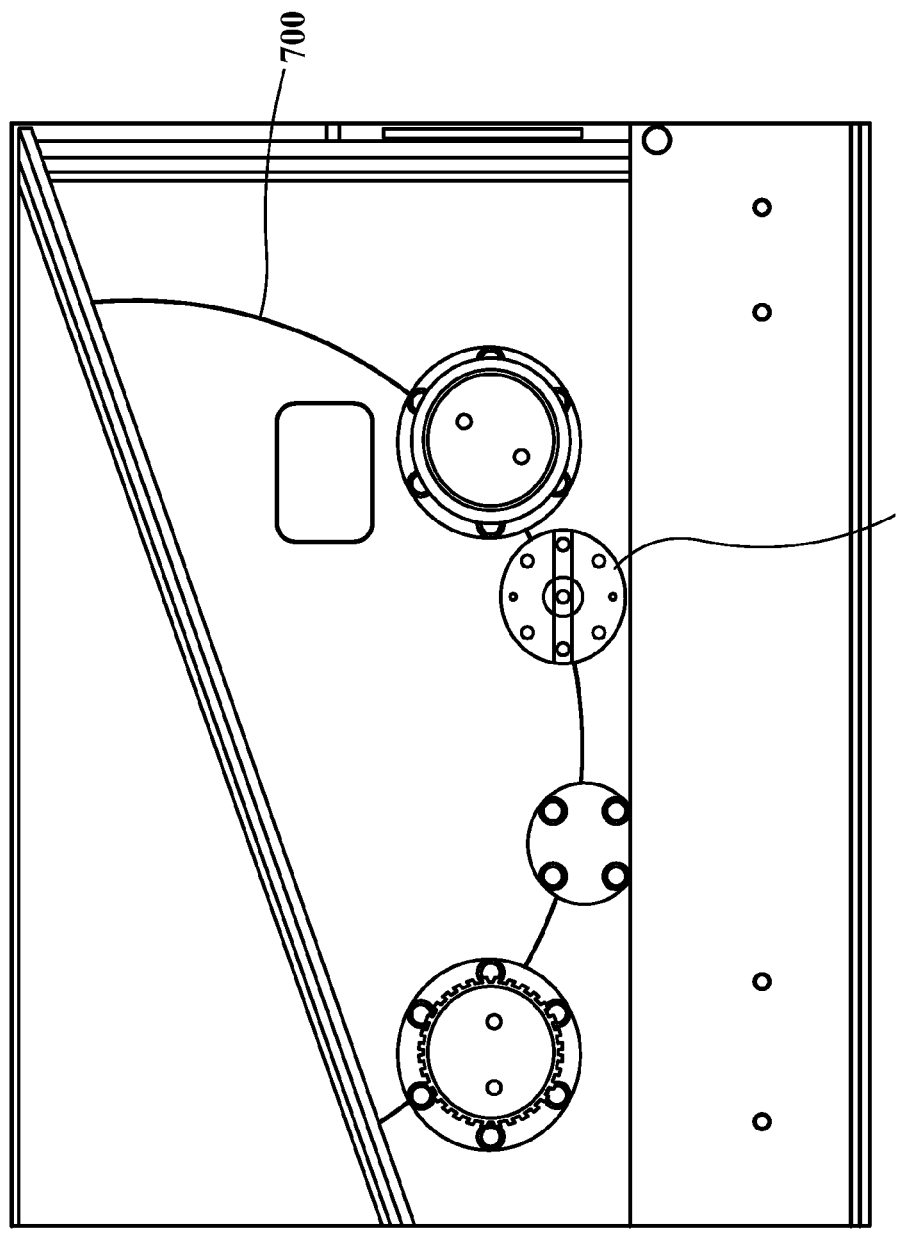
FIG. 7 is a side view of the megasonic tank in use during electronic device processing in accordance with embodiments of the present invention.

Similar to the scrubber, the megasonic tank may include at least one drive roller and at least one idle roller as shown in FIG. 7. Such rollers may be coupled to a sidewall of the megasonic tank. A motor of a drive roller may be coupled to a sidewall of the tank. Positioning and functioning of the sensor coupled to the megasonic tank (e.g., relative to the rollers and/or substrate as indicated by reference numeral 710 in FIG. 7) may be similar to that of the sensor included in the scrubber to detect a substrate notch or flat.

Because the sensor is outside of the megasonic tank, it will not be adversely affected by processing temperatures and/or chemicals. Cavitation occurring during processing in the megasonic tank generally will not prevent the through-beam sensor from detecting the substrate notch or flat like may be the case in reflection-based sensors.

Accordingly, while the present invention has been disclosed in connection with exemplary embodiments thereof, it should be understood that other embodiments may fall within the spirit and scope of the invention, as defined by the following claims.

The invention claimed is:

1. An apparatus, comprising:
   a through-beam sensor coupled to a scrubber and adapted to detect a notch or flat of a substrate in the scrubber during processing;
   a controller coupled to the through-beam sensor and adapted to filter noise while the through-beam sensor detects the notch or flat of the substrate;
   wherein the scrubber includes a base and a plurality of rollers proximate to each other and mounted to the base, the plurality of rollers adapted to support the substrate in a vertical orientation as the base positions the plurality of rollers along a lower portion of an edge of the substrate;
   a sensor mounting bracket coupled to the base, wherein the sensor mounting bracket couples the through-beam sensor to the scrubber and positions the through-beam sensor along the lower portion of the edge of the substrate;
   the through-beam sensor having:
      an emitter facing a first major surface of a substrate in the scrubber and adapted to transmit a beam toward an edge of the first major surface; and
      a receiver facing a second major surface of the substrate and adapted to receive the beam transmitted from the emitter when the edge of the substrate does not obstruct the beam.

2. The apparatus of claim 1 wherein the through-beam sensor is about 10 mm to about 15 mm from the one or more rollers of the scrubber adapted to couple to the substrate.

3. The apparatus of claim 1 wherein at least one of:
   the emitter is about 15 mm from the first major surface of the substrate; and
   the receiver is about 15 mm from the second major surface of the substrate.

4. The apparatus of claim 1 further comprising a cable coupling the through-beam sensor to the mounting bracket.

5. The apparatus of claim 4 wherein the cable is coated with a material that is resistant to at least one of temperatures or chemicals employed during processing.

6. The apparatus of claim 1 wherein the emitter and receiver are coated with a material that is resistant to at least one of temperatures and chemicals employed during processing.

7. The apparatus of claim 1 wherein the sensor is within a tank of the scrubber during processing.

8. An apparatus, comprising:
a through-beam sensor coupled to a megasonic tank and adapted to detect a notch or flat of a substrate in the megasonic tank during processing;
a controller coupled to the through-beam sensor and adapted to filter noise while the through-beam sensor detects the notch or flat of the substrate;
wherein the megasonic tank includes a base and plurality of rollers proximate to each other and mounted to the base, the plurality of rollers adapted to support the substrate in a vertical orientation as the base postions the plurality of rollers along a lower portion of an edge of the substrate;
a sensor mounting bracket coupled to the base, wherein the sensor mounting bracket couples the through-beam sensor to the megasonic tank and positions the through-beam sensor along the lower portion of the edge of the substrate;
the through-beam sensor having:
an emitter facing a first major surface of a substrate in the megasonic tank and adapted to transmit a beam toward an edge of the first major surface; and
a receiver facing a second major surface of the substrate and adapted to receive the beam transmitted from the emitter when the edge of the substrate does not obstruct the beam.

9. The apparatus of claim 8 wherein the through-beam sensor is about 10 mm to about 15 mm from the one or more rollers of the megasonic tank adapted to couple to the substrate.

10. The apparatus of claim 8 wherein at least one of:
the emitter is about 15 mm from the first major surface of the substrate; and
the receiver is about 15 mm from the second major surface of the substrate.

11. The apparatus of claim 8 further comprising:
a first housing coupled to a first sidewall of the megasonic tank, the first housing is adapted to protect the emitter from temperatures or chemicals employed in the megasonic tank during processing; and
a second housing coupled to a second sidewall of the megasonic tank, the second housing is adapted to protect the receiver from temperatures or chemicals employed in the megasonic tank during processing.

12. The apparatus of claim 11 wherein the first and second housing include quartz.

13. The apparatus of claim 11 wherein the first and second housing include haylar.

14. The apparatus of claim 11 further comprising:
a first mounting bracket adapted to couple the emitter to the first housing; and
a second mounting bracket adapted to couple the receiver to the second housing.

15. A method of semiconductor device manufacturing, comprising:
providing a scrubber including a base and a plurality of rollers proximate to each other and mounted to the base;
supporting a substrate in a vertical orientation via the plurality of rollers in the base positioned along a lower portion of an edge of the substrate;
providing a through-beam sensor coupled to the scrubber and positioned along the lower portion of the edge of the substrate via a sensor mounting bracket coupled to the base, the through-beam sensor adapted to detect a notch or flat of the substrate in the scrubber during processing, and wherein the through-beam sensor includes an emitter facing a first major surface of a substrate in the scrubber adapted to transmit a beam toward the edge of the first major surface, and a receiver facing a second major surface of the substrate adapted to receive the beam transmitted from the emitter when the edge of the substrate does not obstruct the beam;
employing the through-beam sensor to detect a notch or flat of a substrate in the scrubber during processing;
providing a controller coupled to the through-beam sensor and adapted to filter noise while the through-beam sensor detects a notch or flat of the substrate; and
filtering noise using the controller while employing the through-beam sensor to detect a notch or flat of the substrate in the scrubber during processing.

16. The method of claim 15 wherein the through-beam sensor is about 10 mm to about 15 mm from the one or more rollers of the scrubber adapted to couple to the substrate.

17. The method of claim 15 wherein at least one of:
the emitter is about 15 mm from the first major surface of the substrate; and
the receiver is about 15 mm from the second major surface of the substrate.

18. The method of claim 15 coupling the through-beam sensor to the mounting bracket using a cable.

19. The method of claim 15 further comprising, based on the substrate notch or flat detection, determining at least one of a position of the substrate, rotation speed of the substrate and a break in the substrate.

20. A method of semiconductor device manufacturing, comprising:
providing a megasonic tank including a base and a plurality of rollers proximate to each other and mounted to the base;
supporting a substrate in a vertical orientation via the plurality of rollers in the base positioned along a lower portion of an edge of the substrate;
providing a through-beam sensor coupled to the megasonic tank and positioned along the lower portion of the edge of the substrate via a sensor mounting bracket coupled to the base, the through-beam sensor adapted to detect a notch or flat of the substrate in the megasonic tank during processing, wherein the through-beam sensor includes an emitter facing a first major surface of a substrate in the megasonic tank adapted to transmit a beam toward the edge of the first major surface, and a receiver facing a second major surface of the substrate adapted to receive the beam transmitted from the emitter when the edge of the substrate does not obstruct the beam;
employing the through-beam sensor to detect a notch or flat of a substrate in the megasonic tank during processing;
providing a controller coupled to the through-beam sensor and adapted to filter noise while the through-beam sensor detects a notch or flat of the substrate; and
filtering noise using the controller while employing the through-beam sensor to detect a notch or flat of the substrate in the megasonic tank during processing.

21. The method of claim 20 wherein the through-beam sensor is about 10 mm to about 15 mm from the one or more rollers of the megasonic tank adapted to couple to the substrate.

22. The method of claim 20 wherein at least one of:
the emitter is about 15 mm from the first major surface of the substrate; and
the receiver is about 15 mm from the second major surface of the substrate.

23. The method of claim 20 further comprising, based on the substrate notch or flat detection, determining at least one of a position of the substrate, rotation speed of the substrate and a break in the substrate.

* * * * *